US012718112B1

(12) United States Patent
Anderson et al.

(10) Patent No.: US 12,718,112 B1
(45) Date of Patent: Aug. 25, 2026

(54) INTELLIGENT AUTONOMOUS ARTIFICIAL INTELLIGENCE (AI) AGENT PLATFORM WITH TRAINING AND DEPLOYMENT MODULES

(71) Applicant: AMESA, Inc., Walnut Creek, CA (US)

(72) Inventors: Kence Anderson, Martinez, CA (US); Xavier Geerinck, Nieuwkerken-Waas (BE); Hunter Park, Evanston, IL (US)

(73) Assignee: AMESA, Inc., Walnut Creek, CA (US)

( * ) Notice: Subject to any disclaimer, the term of this patent is extended or adjusted under 35 U.S.C. 154(b) by 0 days.

(21) Appl. No.: 19/191,318

(22) Filed: Apr. 28, 2025

Related U.S. Application Data

(60) Provisional application No. 63/641,392, filed on May 1, 2024.

(51) Int. Cl.
*G06N 3/10* (2006.01)
*G06N 3/092* (2023.01)

(52) U.S. Cl.
CPC ............... *G06N 3/10* (2013.01); *G06N 3/092* (2023.01)

(58) Field of Classification Search
CPC ................................. G06N 3/10; G06N 3/092
See application file for complete search history.

(56) References Cited

U.S. PATENT DOCUMENTS

2018/0293463 A1 10/2018 Brown
2023/0376012 A1* 11/2023 You .................... G05B 19/4184
2023/0386045 A1* 11/2023 Amelon ............... A61B 5/4547
2024/0330701 A1* 10/2024 Jaderberg ............... G06N 3/086
2025/0209337 A1* 6/2025 Bhoopchand .......... G06N 3/092

FOREIGN PATENT DOCUMENTS

WO 2018236674 A1 12/2018
WO 2021221801 A1 11/2021

OTHER PUBLICATIONS

AgentOps Website May 2024.
Anderson, K., Book entitled "Designing Autonomous AI—A Guide for Machine Teaching", Chapter 4, Jun. 10, 2022.

(Continued)

*Primary Examiner* — Henry Nguyen
(74) *Attorney, Agent, or Firm* — Morse, Barnes-Brown & Pendleton, P.C.; Sean D. Detweiler, Esq.

(57) ABSTRACT

A platform for developing autonomous AI agents capable of intelligent behavior includes a simulation environment for creating AI trainable simulations, an agent shell configurator for customizing agent frameworks, a sensor configurator for feedback provision, a perceptor configurator for processing sensor variables, a scenario configurator for training variability, and a skills configurator for task-specific expertise. These components are used to create untrained autonomous AI agents with sensor, perceptor, scenario, and skills modules, along with performable actions. A training module dynamically transforms untrained AI agents into trained ones through training exercises, and a deployment module exports trained AI agents as executable code or file artifact. When deployed in real-world systems, the trained autonomous AI agents exhibit intelligent behavior by perceiving environments, autonomously taking actions, and improving performance through learning based on real-world expertise data.

28 Claims, 14 Drawing Sheets

(56) References Cited

OTHER PUBLICATIONS

Anderson, K., Book entitled "Designing Autonomous AI—A Guide for Machine Teaching", Chapter 5, Jun. 10, 2022.
Anderson, K., Book entitled "Designing Autonomous AI—A Guide for Machine Teaching", Chapter 7, Jun. 10, 2022.
Anderson, K., Book entitled "Designing Autonomous AI—A Guide for Machine Teaching", Chapter 8, Jun. 10, 2022.
Anderson, K., Book entitled "Designing Autonomous AI—A Guide for Machine Teaching", pp. 135-141, Jun. 10, 2022.
Anderson, K., Book entitled "Designing Autonomous AI—A Guide for Machine Teaching", pp. 188-190, Jun. 10, 2022.
Composable Home Page accessed Sep. 25, 2025 https://autonomy.university/.
Generally Capable Agents Emerge From Open-ended Play (https://deepmind.google/discover/blog/generally-capable-agents-emerge-from-open-ended-play/) Google Deepmind, Jul. 27, 2021, accessed Sep. 25, 2025.
Getting Started Composabl website accessed Sep. 25, 2025 https://docs.composabl.io/.
Sutton, R.S. et al., "Between MDPs and semi-MDPs: A framework for temporal abstraction in reinforcement learning", Artificial Intelligence 112 (1999) 181-211.

* cited by examiner

1200

```
agent_multidiscrete = Agent()
agent_multidiscrete.add_sensors(sensors_multi_discrete)
agent_multidiscrete.add_skill(expert_skill_controller)
agent_multidiscrete.add_skill(random_skill_controller)
agent_multidiscrete.add_selector_skill(
    target_skill_multi_discrete,
    [expert_skill_controller, random_skill_controller],
    fixed_order=True,
    fixed_order_repeat=False
)
```

FIG. 12

INTELLIGENT AUTONOMOUS ARTIFICIAL INTELLIGENCE (AI) AGENT PLATFORM WITH TRAINING AND DEPLOYMENT MODULES

CROSS-REFERENCE TO RELATED APPLICATION(S)

This application claims priority to, and the benefit of, U.S. Provisional Application 63/641,392, filed May 1, 2024, for all subject matter common to both applications. The disclosure of said provisional application is hereby incorporated by reference in its entirety.

FIELD OF THE INVENTION

The present invention relates to autonomous artificial intelligence (AI) agents suitable for deployment in real-world systems. In particular, the present invention relates to creating autonomous AI agents that act in an intelligent manner using data characterizing real-world expertise embodied in one or more skills modules of the autonomous AI agent.

BACKGROUND

Historically, real-world expertise, know-how, and skills for performing tasks in an industry were embodied in the mind(s) of the personnel performing or overseeing the task as well as the specialized hardware and/or software used by the personnel to perform the task. As such, when personnel are lost, the real-world expertise, know-how, and skills can also be lost if not captured and transferred to new personnel.

While artificial intelligence, such as an autonomous AI agent, can be used to replace personnel in performing many such tasks, such artificial intelligence is typically designed and trained without the benefit of the real-world expertise, know-how, and skills of the personnel who previously performed the task. That is, typically, in designing and training artificial intelligence to perform a task, the artificial intelligence is designed around the inputs and outputs of the system of the task and trained by being asked to perform the task repeatedly (via simulation) until it learns how to perform the task. Such conventional design and artificial intelligence training largely ignores the real-world expertise, know-how, and skills that already exist for performing the task.

SUMMARY

Thus, what is needed is a way to capture real-world expertise, know-how, and skills for performing a task and incorporate these factors into the design of an autonomous AI agent designed to perform the task. The present invention is directed toward further solutions to address this need, in addition to having other desirable characteristics. Specifically, the present invention provides a platform for creating autonomous AI agents that act intelligently and use skills based on real-world expertise to achieve their desired goals.

Per embodiments of the present invention, a platform for creating autonomous AI agents that act intelligently is provided. The platform includes a simulation environment that receives a simulator code defining real-world modeled system and creates an environment simulation within the platform; an agent shell configurator that provides an agent framework and receives modules that customize the agent framework to result in the autonomous AI agent; a sensor configurator that creates sensor modules that are each configured to provide feedback to the autonomous AI agent; a perceptor configurator that creates perceptor modules that are each configured to receive sensor variables, process the sensor variables, and output one or more new sensor variables to the sensor configurator, which creates additional sensor modules based on the new sensor variables; a scenario configurator that creates scenario modules that are each configured to operate autonomous AI agents in different conditions; a skills configurator that creates skills modules that are created to translate real-world expertise into skills modules configured to execute specific tasks using the encoded real-world expertise each skills module embodies, resulting in an action performed by the autonomous AI agent. The agent shell configurator, sensor configurator, perceptor configurator, scenario configurator, and skills configurator of the platform create an untrained autonomous AI agent.

The AI agent includes one or more sensor modules, optionally one or more perceptor modules, one or more scenario modules, one or more skills modules, and one or more performable actions; a training module that implements a plurality of training exercises executed by the autonomous AI agent, which dynamically transform the untrained autonomous AI agent into a trained autonomous AI agent using the skills modules of the autonomous AI agent; and a deployment module that exports the trained autonomous AI agent as executable code or a file artifact.

When the exported trained autonomous AI agent is deployed as executable code or a file artifact in a real-world system to control hardware and/or software of the real-world system autonomously or generate a recommendation based on data of the system, the exported autonomous AI agent acts in an intelligent manner by perceiving environment, taking actions autonomously to achieve goals, and improving performance through learning using the data characterizing real-world expertise embodied in the one or more skills modules of the autonomous AI agent.

In accordance with aspects of the present invention, the simulation environment includes an observation space where data points are available as simulation outputs and an action space establishing the actions that can be performed as simulation inputs.

In accordance with aspects of the present invention, the agent shell configurator creates agents having a type selected from the group consisting of: autopilot, operator, trader, producer, scheduler, building engineer, and assembler.

In accordance with aspects of the present invention, the scenario modules receive one or more simulation configuration variables and values that will be used to train the agent in different conditions.

In accordance with aspects of the present invention, the scenario configurator assigns created scenario modules to skills modules.

In accordance with aspects of the present invention, the skills modules have a category type selected from the group consisting of: learned skill, selector skill, controller skill, coordinated skill, and a grouping of one or more of: learned skill, selector skill, controller skill, and coordinated skills modules.

In accordance with aspects of the present invention, the skills are orchestrated using one or more of: selector skills, sequencing, looping, or hierarchy.

In accordance with aspects of the present invention, a skill performed by the skills module is one of a learned skill or a programmed skill. In some aspects, the programmed skill is defined through calculations, rules, and algorithms. In other aspects, the learned skill is learned through deep reinforcement learning (DRL).

In accordance with aspects of the present invention, the autonomous AI agent includes one or more defined goals. In some aspects, the training module provides functions for an autonomous AI agent to achieve a goal, including: compute reward, compute terminate, and compute success criteria.

In accordance with aspects of the present invention, the training module enables rules to be defined for the autonomous AI agent during training exercises executed by the autonomous AI agent.

In accordance with aspects of the present invention, the training module provides functions for an autonomous AI agent to manage information including transform sensor variables, transform actions, and filtering sensors.

In accordance with aspects of the present invention, the skills configurator is configured to save, export, and import skills to and from other agents.

In accordance with embodiments of the present invention, a method of creating autonomous AI agents that act in an intelligent manner is provided. The method involves providing a platform for creating autonomous AI agents as described herein; creating an untrained autonomous AI agent as described herein using the agent shell configurator, sensor configurator, perceptor configurator, scenario configurator, and skills configurator of the platform; the training module dynamically transforming the untrained autonomous AI agent into a trained autonomous AI agent; and the deployment module exporting the trained autonomous AI agent as executable code or file artifact for deployment in a real-world system to control hardware and/or software of the real-world system autonomously or generate a recommendation based on the data of the real-world system, wherein the exported autonomous AI agent acts in an intelligent manner by perceiving the agent environment, taking actions autonomously to achieve goals, and improving performance through learning using the encoded real-world expertise embodied in the one or more skills modules of the autonomous AI agent.

In accordance with aspects of the present invention, the simulation environment includes an observation space where data points are available and an action space establishing the actions that can be performed.

In accordance with aspects of the present invention, the agent shell configurator creates agents having a type selected from the group consisting of: autopilot, operator, trader, producer, scheduler, building engineer, and assembler.

In accordance with aspects of the present invention, the scenario modules receive one or more simulation configuration variables and values that will be used to train the agent in different conditions.

In accordance with aspects of the present invention, the scenario configurator assigns created scenario modules to skills modules.

In accordance with aspects of the present invention, the skills modules have a category type selected from the group consisting of: learned skill, selector skill, controller skill, coordinated skill, and a grouping of one or more of: learned skill, selector skill, controller skill, and coordinated skills modules.

In accordance with aspects of the present invention, the skills are orchestrated using one or more of: selector skills, sequencing, looping, or hierarchy.

In accordance with aspects of the present invention, a skill performed by the skills module is one of learned skill or programmed skill. In some aspects, the programmed skill is defined through calculations, rules, and algorithms. In other aspects, the learned skill is learned through deep reinforcement learning (DRL).

In accordance with aspects of the present invention, the autonomous AI agent includes one or more defined goals. In some aspects, the training module provides functions for an autonomous AI agent to achieve a goal, including: compute reward, compute terminate, and compute success criteria.

In accordance with aspects of the present invention, the training module enables rules to be defined for the autonomous AI agent during training exercises executed by the autonomous AI agent.

In accordance with aspects of the present invention, the training module provides functions for an autonomous AI agent to manage information including transform sensor variables, transform actions, and filtering sensors.

In accordance with aspects of the present invention, the skills configurator is configured to save, export, and import skills to and from other agents.

BRIEF DESCRIPTION OF THE FIGURES

These and other characteristics of the present invention will be more fully understood by reference to the following detailed description in conjunction with the attached drawings, in which:

FIG. 12 is an example code for creating an autonomous AI agent in accordance with embodiments of the present invention;

DETAILED DESCRIPTION

Figure 1:
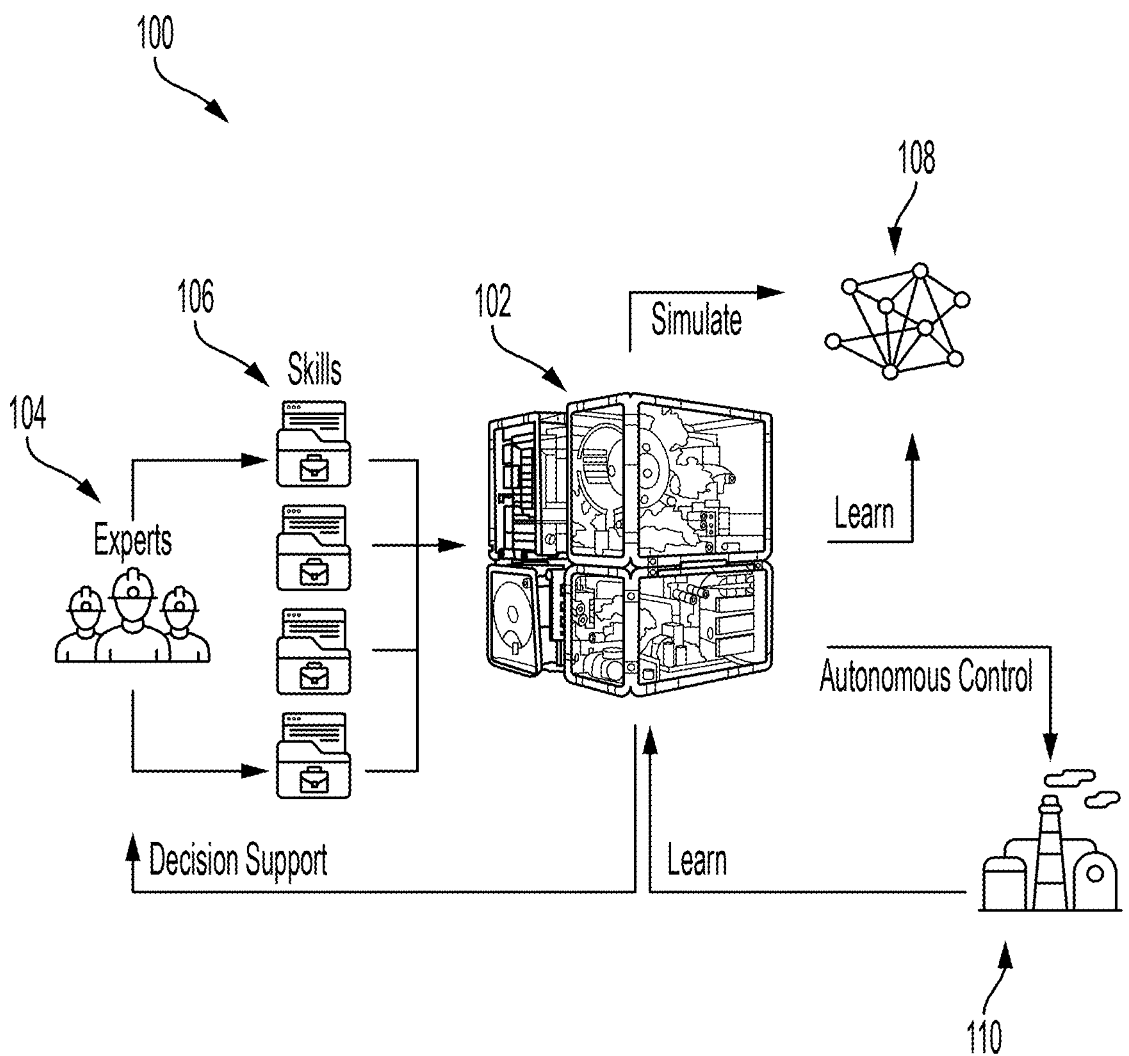
FIG. 1 is a conceptual representation of the environments and inputs involved with the development, training, and deployment of an autonomous AI agent in accordance with embodiments of the present invention.

An illustrative embodiment of the present invention relates to a platform for developing autonomous AI agents capable of intelligent behavior. As utilized herein, "autonomous AI agents" are self-governing systems that can perceive their environment and act on it without constant human control. The platform includes a simulation environment for creating AI trainable simulations, an agent shell configurator for customizing agent frameworks, a sensor configurator for feedback provision, a perceptor configurator for processing sensor variables, a scenario configurator for training variability, and a skills configurator for task-specific expertise. These components are used to create untrained autonomous AI agents with sensor, perceptor, scenario, and skills modules, along with performable actions. A training module dynamically transforms untrained agents into trained ones through training exercises, and a deployment module exports trained agents as executable code or file artifacts. When deployed in real-world systems, the trained autonomous AI agents exhibit intelligent behavior by perceiving environments, autonomously taking actions, and improving performance through learning based on real-world expertise data.

FIG. 1 through FIG. 14, wherein like parts are designated by like reference numerals throughout, illustrate an example embodiment or embodiments of a platform for creating autonomous AI agents according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts a conceptual representation 100 of the environments and inputs involved with the development, training, and deployment of an autonomous AI agent 102. Here, the autonomous AI agent 102 represents and indicates the autonomous AI agent 102 throughout its development, including its untrained, trained, and deployed states, while reference numbers 232, 238, and 240 are later used to indicate the particular state of the autonomous AI agent 102. On the left of the autonomous AI agent 102 are the experts 104 who possess the know-how and expertise of how to perform a task. This know-how and expertise are captured as skills 106 in the creation of the autonomous AI agent 102 for performing the task. The autonomous AI agent 102 can then be provided a simulation environment 108 in which skills 106 can be learned and the autonomous AI agent 102 can be trained to perform the task. Once trained, the autonomous agent can be deployed in a real-world system 110 to control hardware and/or software. The autonomous AI agent 102 learns, adapts, and improves both the autonomous agent's performance of the task, and the skills used to perform the task.

Figure 2:
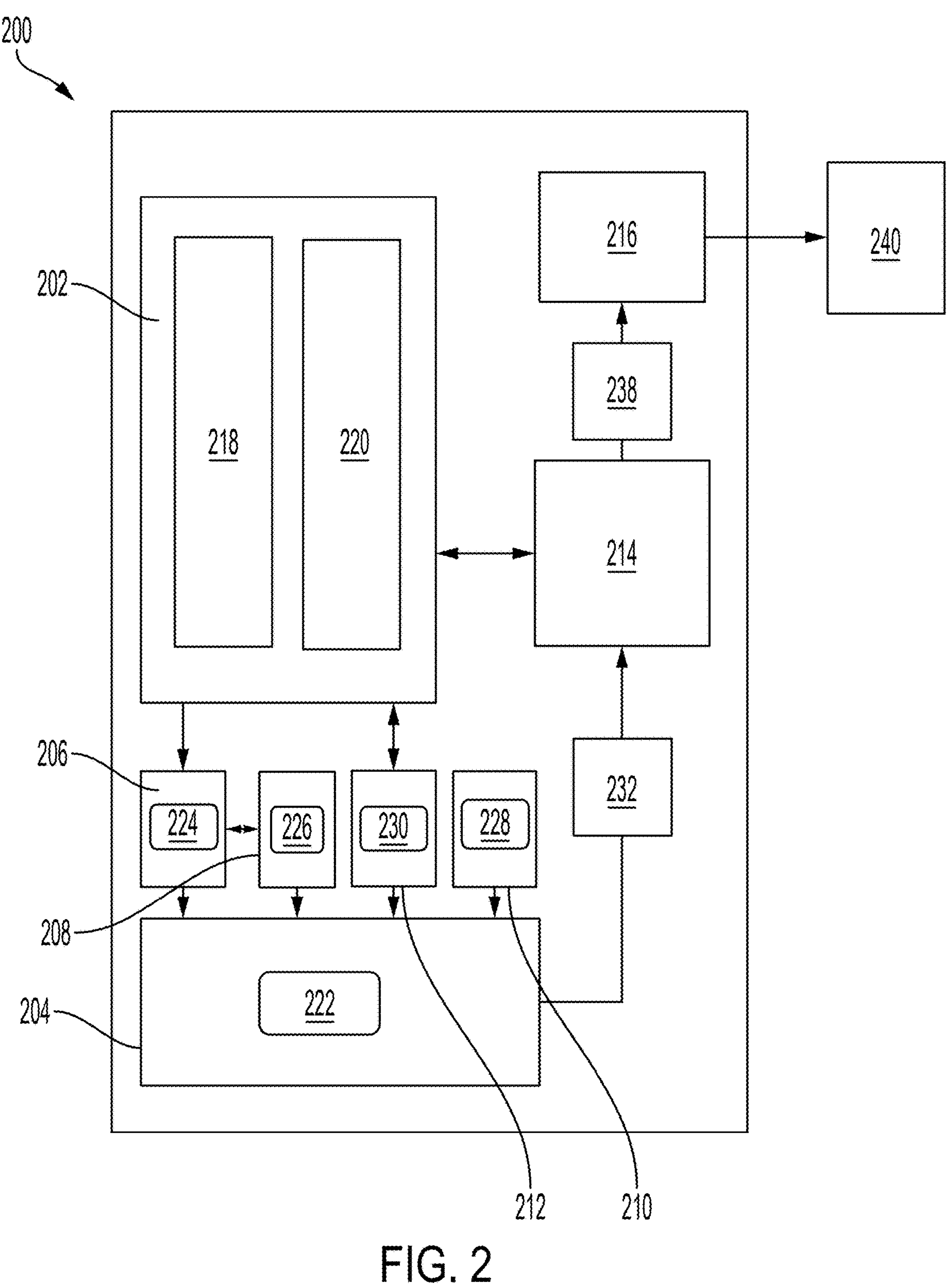
FIG. 2 is a high-level block diagram representation of a platform for creating autonomous AI agents in accordance with embodiments of the present invention.

FIG. 2 is a high-level block diagram representation of a computer-implemented platform 200 for creating autonomous AI agents 102 in accordance with embodiments of the present invention. The platform 200 comprises a simulation environment 202, an agent shell configurator 204, a sensor configurator 206, a perceptor configurator 208, a scenario configurator 210, a skills configurator 212, a training module 214, and a deployment module 216. The functionality of these modules 202-216 can be implemented in hardware, software, or a combination of both.

The simulation environment 202 is configured to receive a simulation code defining a real-world modeled system and create an environment simulation within the platform 200. In certain embodiments, the simulation environment 202 comprises an observation space 218 where output data points are available to the AI agent 102 and an action space 220 establishing the actions that can be performed in the simulation environment.

The agent shell configurator 204 provides an agent framework 222 and is configured to receive modules that customize the agent framework 222 to result in the autonomous AI agent 102. In certain embodiments, the agent shell configurator 204 is configured to create autonomous AI agents 102 having a type selected from the group consisting of: autopilot, operator, trader, producer, scheduler, building engineer, and assembler. Other types of autonomous AI agents 102 will be apparent to one skilled in the art, given the benefit of this disclosure.

The sensor configurator 206 is for creating sensor modules 224 that are each configured to provide feedback to the autonomous AI agent 102. In certain embodiments, the sensor modules 224 created are based on the mapped data available in the observation space 218 of the simulation environment 202.

The perceptor configurator 208 is for creating perceptor modules 226 that are each configured to receive sensor variables, process the sensor variables, and output one or more new sensor variables to the sensor configurator 206, which creates additional sensor modules 224 based on the new sensor variables. In certain embodiments, the perceptor modules 226 created are based on the sensor modules 224 created. Perceptor modules 226 can be created from transformation mathematical formulas, machine learning algorithms, image or audio transformers, dimensionality reduction algorithms, and others.

The scenario configurator 210 is for creating scenario modules 228 that are simulation configuration variables and values that will be used to train the autonomous AI agents 102 in different conditions, increasing agent robustness and adaptation. Scenario modules may be created to apply randomness to the system, change operating conditions, or represent sub-routines or intermediate tasks needed to perform the larger task of the autonomous AI agent 102. Accordingly, scenario modules 228 may deal with subsets of the simulation state space provided by sensor modules 224 or perceptor modules 226. In some such embodiments, these data may comprise one or more of: discrete variables, continuous variables, and continuous variable ranges.

The skills configurator 212 is for creating skills modules 230 that are based on encoded real-world expertise (skills 106). Each skills module 230 is configured to execute specific tasks using the encoded real-world expertise (skills 106) that the skills module 230 embodies, resulting in an action performed by the autonomous AI agent 102. Skills modules 230 may be created based on the sensor modules 224 or perceptor modules 226 created. Skills modules can encode real-world expertise with Reinforcement Learning Policies, Deep Learning neural networks, algorithms, or mathematical rules.

In certain embodiments, the skills modules 230 have a category type selected from the group consisting of: learned skills, selector skill, controller skill, coordinated skill; and a grouping of one or more of: learned skills, selector skill, controller skill, and coordinated skills modules. In some embodiments, skills are orchestrated using one or more of: selector skills, sequencing, looping, or hierarchy.

The skills performed by a skills module 230 may be learned or programmed. Programmed skills are defined through calculations, rules, and algorithms. Learned skills can be learned through deep reinforcement learning (DRL). In some such embodiments, this learning can be performed in the simulation environment.

In some embodiments, the skills configurator is configured to save, export, and import skills modules 230 to and from other agents 102.

In some embodiments, the creation of a skills module may be guided through the use of a questionnaire or a Large Language Model (LLM) system that refines the options available to a designer based on answers to questions about the skill to be implemented.

In certain embodiments, once a skills module 230 has been created, scenario modules 228 can be assigned to the skills module 230 using the scenario configurator 210. Multiple skills can be associated with a scenario module 228 in this manner.

The agent shell configurator 204, sensor configurator 206, perceptor configurator 208, scenario configurator 210, and skills configurator 212 of the platform 200 are used to create an untrained version (untrained autonomous AI agent 232) of the autonomous AI agent 102. A block diagram representation of such an autonomous AI agent 102 can be seen in FIG. 3.

Figure 3:
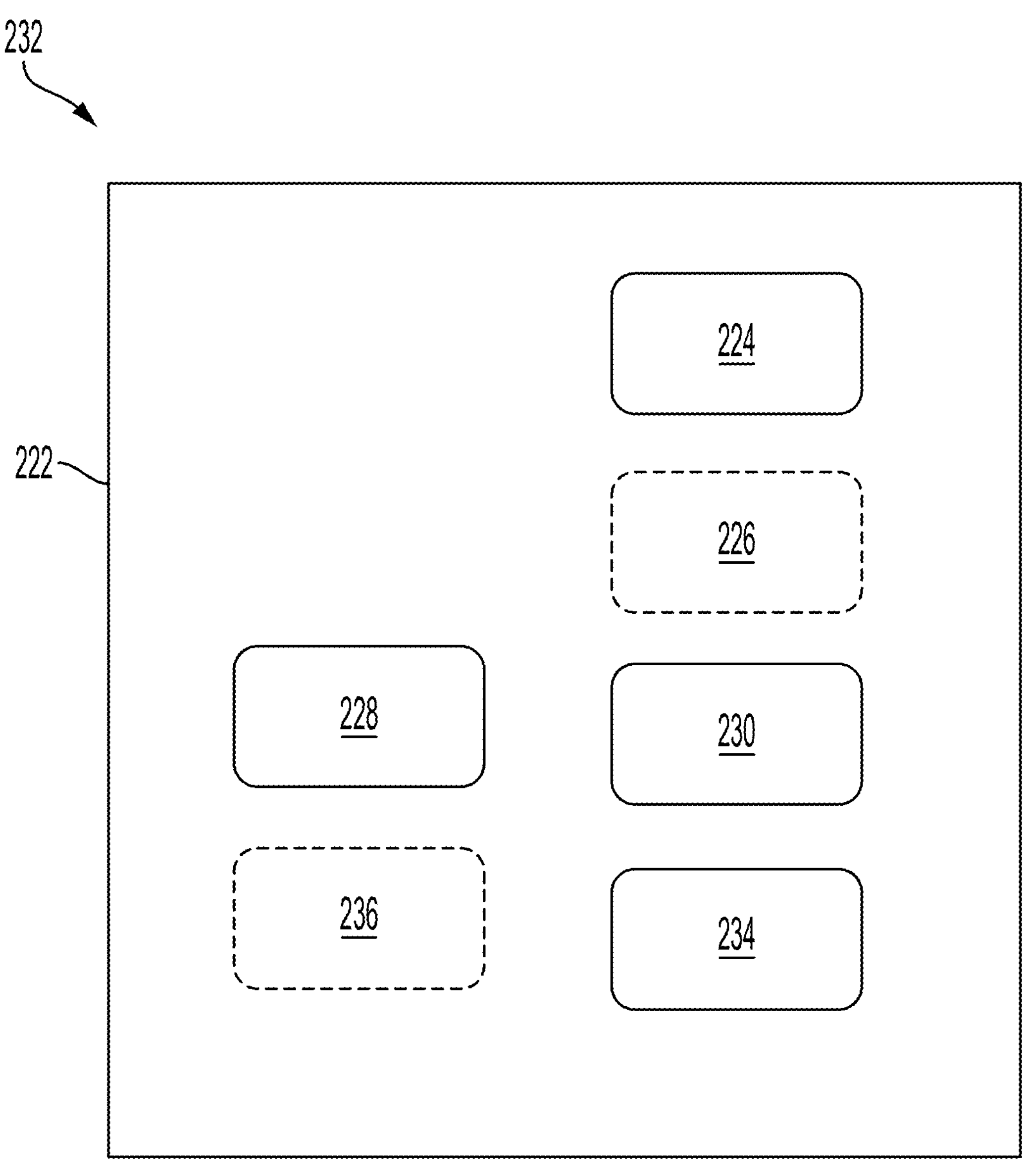
FIG. 3 is a block diagram representation of an autonomous AI agent in accordance with embodiments of the present invention.

In the example of FIG. 3, the autonomous AI agent 102 is an untrained autonomous AI agent 232 comprising framework 222, one or more sensor modules 224 created by the sensor configurator 206, optionally one or more perceptor modules 226 created by the perceptor configurator 208, one or more scenario modules generated by the scenario configurator 210, one or more skills modules 230 generated by the skills configurator 212, and one or more performable actions 234. Performable actions 234 are the results of skills performed by skills modules 230. In certain embodiments, performable actions 234 are determined by the action space 220 of the simulation environment 202. In certain embodiments, the autonomous AI agent 102 may further comprise one or more defined goals 236. The various components of the autonomous AI agent are implemented as software.

Referring back to FIG. 2, the training module 214 is configured to implement a plurality of training exercises executed by an autonomous AI agent 102 to dynamically transform an untrained autonomous AI agent 232 into a trained autonomous AI agent 238 using the skills modules 230 of the autonomous AI agent 102. The training exercises are implemented in the simulation environment 202 of the platform 200, resulting in the trained autonomous AI agent 238, wherein the feedback received from the training exercises is incorporated into the trained autonomous AI agent 238.

In certain embodiments, the one or more defined goals 236 may be defined or learned using the skills configurator 212 and/or the training module 214. Goals may also be associated with a specific scenario module 228 as well. In some such embodiments, the training module 214 may provide the following functionality for an autonomous AI agent to achieve a goal: compute reward, compute terminate, and compute success criteria. Similarly, the training module 214 may also be configured to provide the following functions for an autonomous AI agent 102 to manage information: transform sensor variables, transform actions; and filtering sensors.

The deployment module 216 is configured to export the trained autonomous AI agent 238 as executable code or file artifact exported autonomous AI agent 240. When the exported autonomous AI agent 240 is deployed as executable code or a file artifact in a real-world system 110 to control hardware and/or software of the real-world system 110 autonomously or generate a recommendation based on the data of the system 110, the exported autonomous AI agent 240 acts in an intelligent manner by perceiving environment, taking actions autonomously without requiring human input to achieve goals, and improving performance through learning using the data characterizing real-world expertise embodied in the one or more skills modules 230 of the autonomous AI agent 102.

Figure 4:
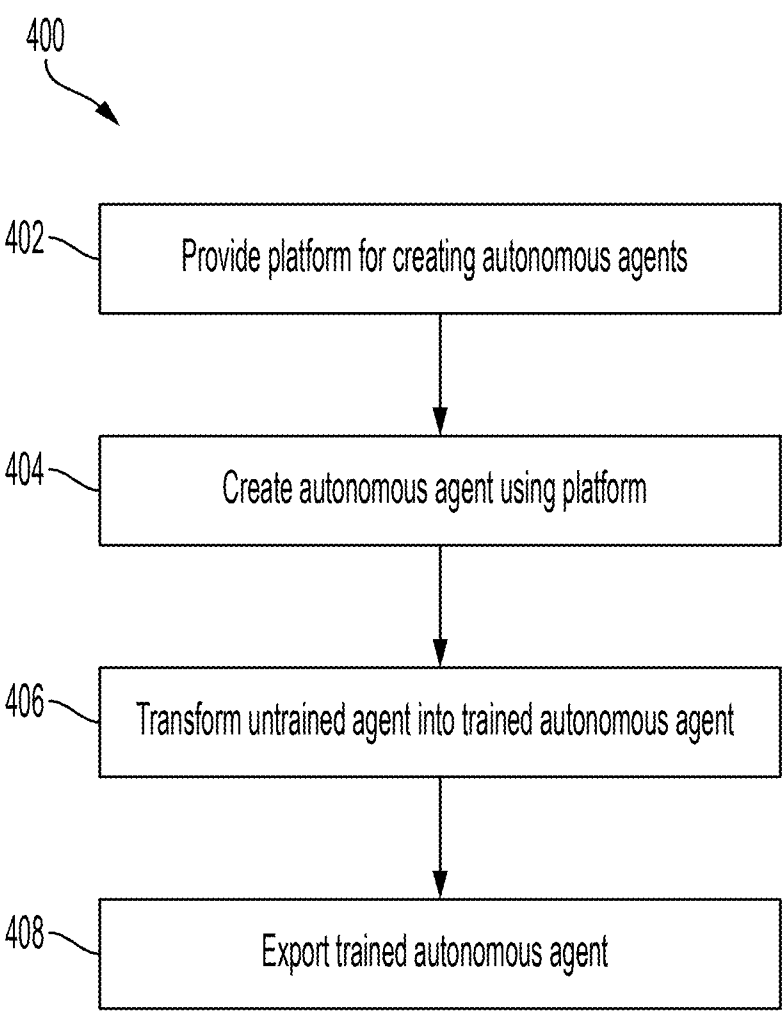
FIG. 4 is an example flow diagram 400 of a method of creating autonomous AI agents in accordance with embodiments of the present invention.

FIG. 4 depicts an example flow diagram 400 of a method of creating autonomous AI agents 102 that act in an intelligent manner. The method begins with providing a platform for creating autonomous AI agents 102 as described herein (Step 402). Then an autonomous AI agent 102 is created in an untrained state (untrained autonomous AI agent 232) using the agent shell configurator 204, sensor configurator 206, perceptor configurator 208, scenario configurator 210, and skills configurator 212 of the platform 200 (Step 404). An example of this can be seen in FIG. 5 through FIG. 11.

Figure 5:
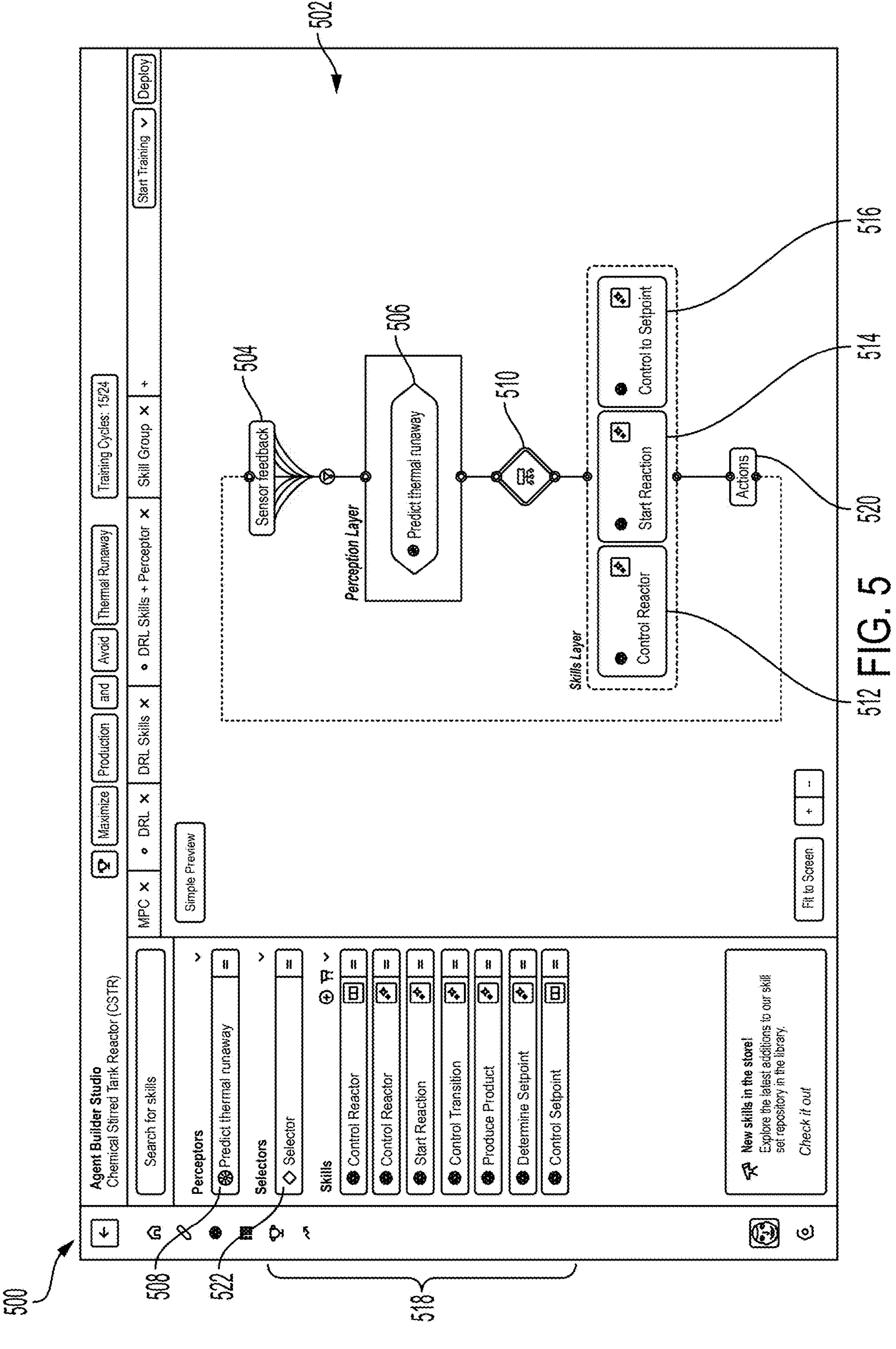
FIG. 5 is a user interface for the platform in accordance with embodiments of the present invention.
Figure 6:
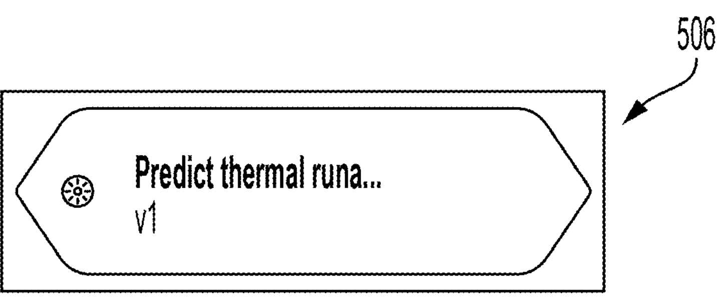
FIG. 6 is an example of a predefined perceptor module selectable using the user interface of FIG. 5 in accordance with embodiments of the present invention.
Figure 7:
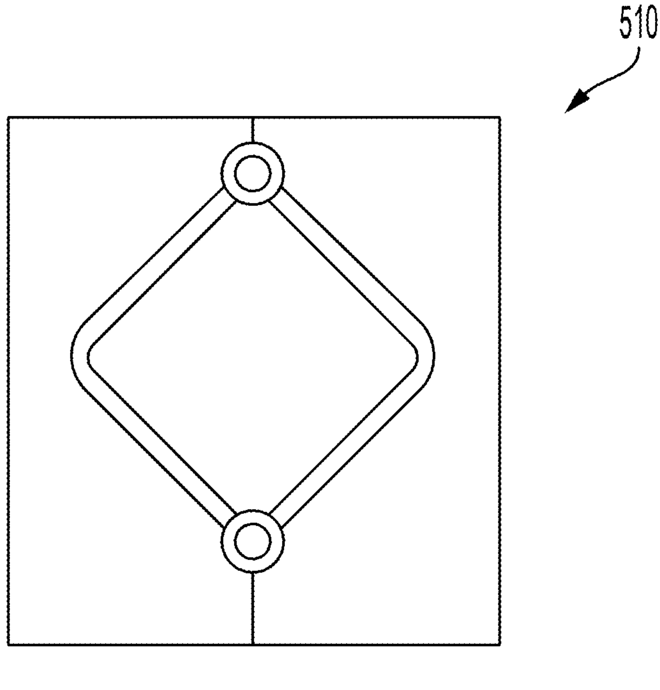
FIG. 7 is an example of a selector skills module selectable using the user interface of FIG. 5 in accordance with embodiments of the present invention.
Figure 8:
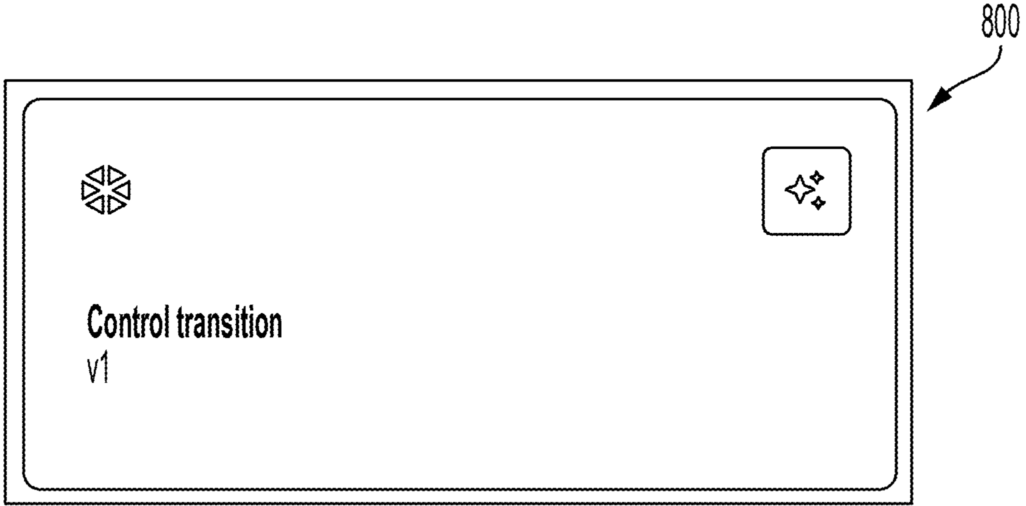
FIG. 8 is an example of a skill module selectable using the user interface of FIG. 5 in accordance with embodiments of the present invention.
Figure 9:
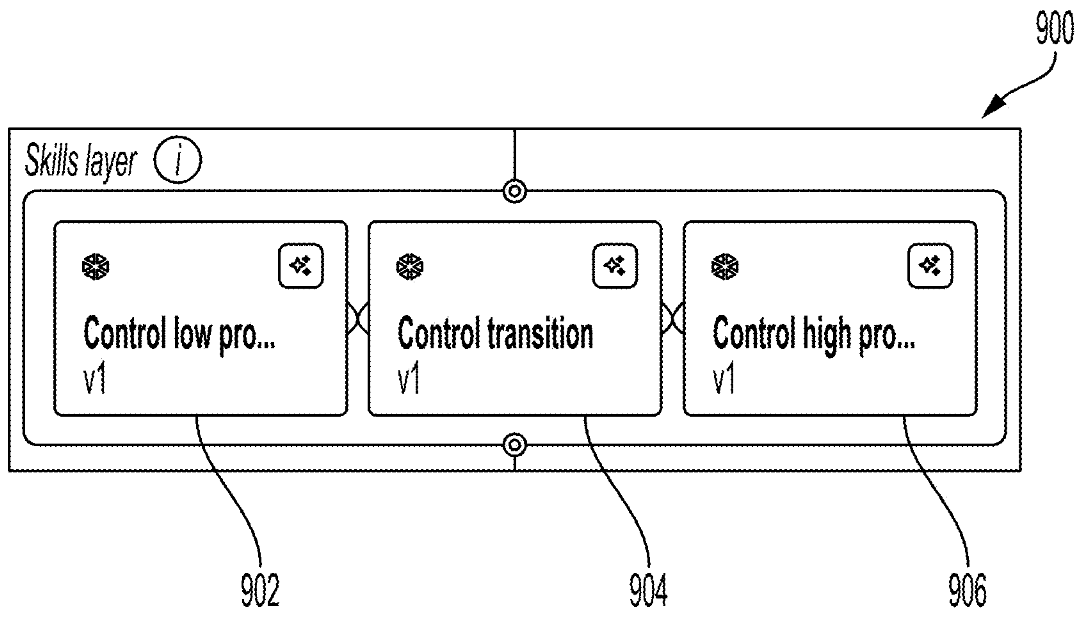
FIG. 9 is an example of a coordinated skills module selectable using the user interface of FIG. 5 in accordance with embodiments of the present invention.
Figure 10:
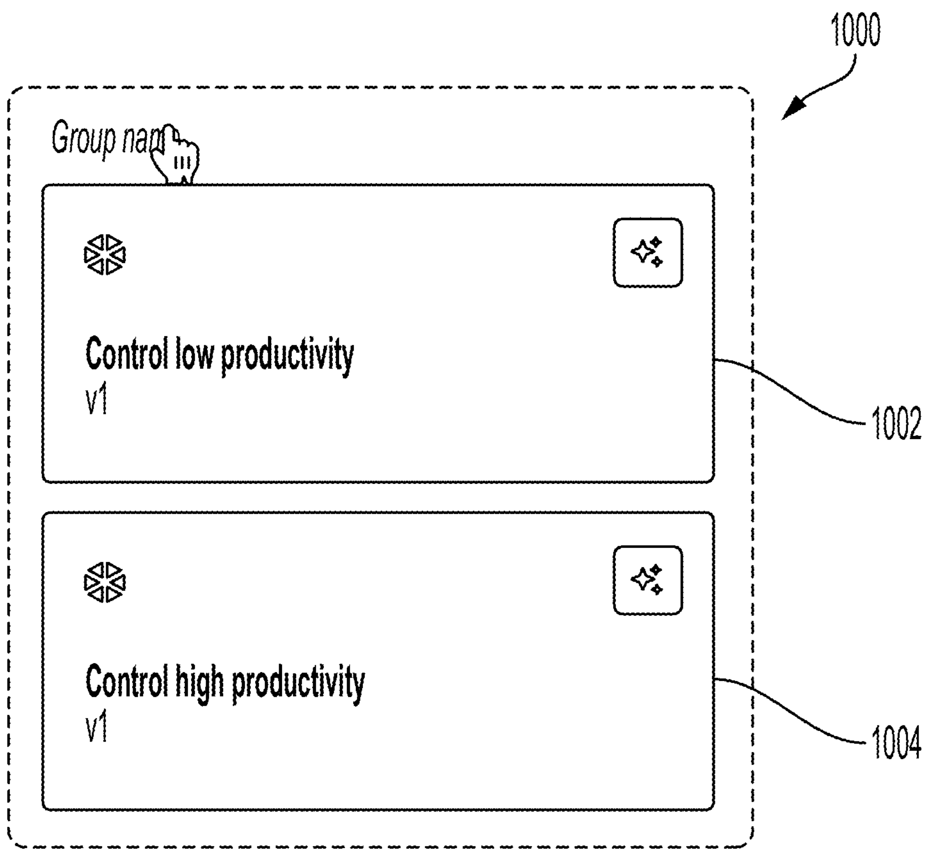
FIG. 10 is an example of a grouped skills module selectable using the user interface of FIG. 5 in accordance with embodiments of the present invention.
Figure 11:
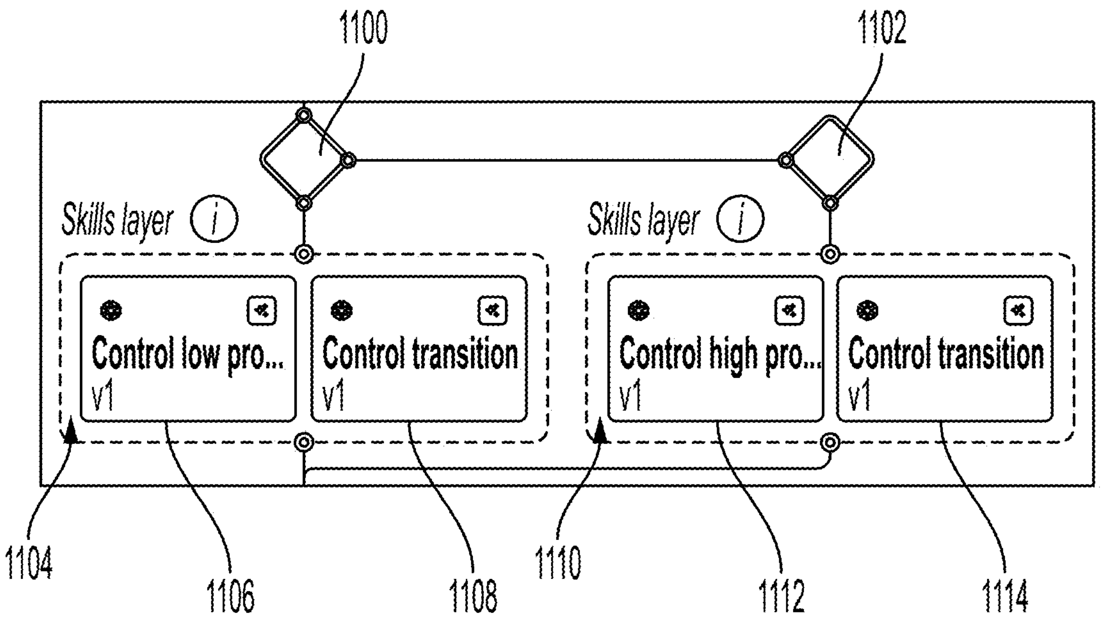
FIG. 11 is an example of a multiple selector skills modules selectable using the user interface of FIG. 5 in accordance with embodiments of the present invention.

FIG. 5 depicts a user interface 500 showing a graphical interface 502 for the agent shell configurator 204. Using this interface 502, a user can provide a sensor module 224, represented by sensor feedback icon 504, created using the sensor configurator 206. A perceptor module 226, represented by perceptor icon 506, can then be created using the perceptor configurator 208, represented here by interface 508, to receive sensor data from the sensor module 224. Skills modules 230, represented here as selector icon 510, control reactor icon 512, start reaction icon 514, and control to setpoint 516, can also be created using skills configurator 212, represented here by interface 518. The performance of a skill results in a performable action 234, represented by action icon 520. The result of this action is then fed back into the simulation environment 202.

In this embodiment, interface 508 comprises a pull-down menu from which a user can select a blank or predefined perceptor module 226, which the user can modify as necessary for the particular autonomous AI agent 102. An example of such a predefined perceptor module 226 can be seen in FIG. 6, where the perceptor module 226 is depicted by the predict thermal runaway icon (perceptor icon 506).

This embodiment further makes use of a selector 510. A selector 510 is a specialized version of a skills module 230. The selector is a skills module 230 that is implemented as a "Teacher" or "Orchestrator", which is an expert for a given problem and tells the system which skills should be used for each case condition. To implement this specific selector skill, a user, such as an expert 104, creates a learned or controller skill, but instead of being configured with the simulation environment action space, it is configured by a Discrete space that works as an enumerator to point to each configured skill. Here, a selector 510 may be selected using a pull-down menu 522 provided as part of the interface 518. The selected selector 510 can be a blank or predefined skills module 230, that the user can modify as necessary for the particular agent 102. An example of such a predefined selector 510 can be seen in FIG. 7.

In this embodiment, the other skills modules 230 comprising control reactor icon 512, start reaction icon 514, and control to setpoint 516 can be activated or "selected" by selector (Orchestrator) 510 or be used standalone. These skills modules 230 and others can be selected from the interface 518, here provided as a pull-down menu from which a user can select blank or predefined skills modules 230, that the user can modify as necessary for the particular agent 102. An example of such predefined skills modules 230 can be seen in FIG. 8, where the skills modules 230 are depicted by the "Control transition" icon 800, which is an example of a skill. Controller skills are typically an existing piece of logic, mathematical equation, machine learning model or other that can be used to solve a specific skill.

In other embodiments, a coordinated skill may be selected. An example of this can be seen in FIG. 9. A coordinated skill uses the rules of a "Coach" who defines how skills work together. Allowing skills to take in shared observations and decide what to do based on those shared observations in view of the other skills. Here the coordinated skill 900 comprises three skills represented by control low productivity icon 902, control transition 904 and control high productivity icon 906.

In still other embodiments, a skill group may be selected. An example of this can be seen in FIG. 10. A skill group is unique in the sense that instead of working independently, it combines 2 or more skills together from the categories above. Sequentially transferring data from one to the other, but acting in the simulation environment as a first grouped skill, and outputting the action for the lowest skill in the sequential group. Here, the skill group 1000 comprises two skills represented by "control low productivity" icon 1002 and "control high productivity" icon 1004. Skill groups are often used as a combination of two different skill types (models), the top skill can be a learned skill that will control parameters for the bottom controller skill that outputs the final action to the simulation environment.

In still further embodiments, multiple selectors may be used. An example of this can be seen in FIG. 11. Here, two selectors represented by icons 1100 and 1102 are used. The first selector represented by icon 1100 selects between grouped skills represented by an icon 1104 comprising a control low productivity icon 1106 and a control transition icon 1108, and the second selector represented by an icon 1102. The second selector represented by the icon 1102 selects a second grouped skill represented by an icon 1110, comprising a control high productivity icon 1112 and a control transition icon 1114. Selectors can be combined in parallel, like in FIG. 11, in hierarchy, following a top-down sequential approach, or a combination of both.

FIG. 12 depicts sample code 1200 for creating an autonomous AI agent 102 such as the untrained autonomous AI agent 232 created using the agent shell configurator 204, sensor configurator 206, and skills configurator 212.

Returning to the flow diagram 400 of FIG. 4, the method continues with the training module 214 dynamically transforming the untrained autonomous AI agent 232 into a trained autonomous AI agent 238 (Step 406). An example of this can be seen in FIG. 13.

Figure 13:
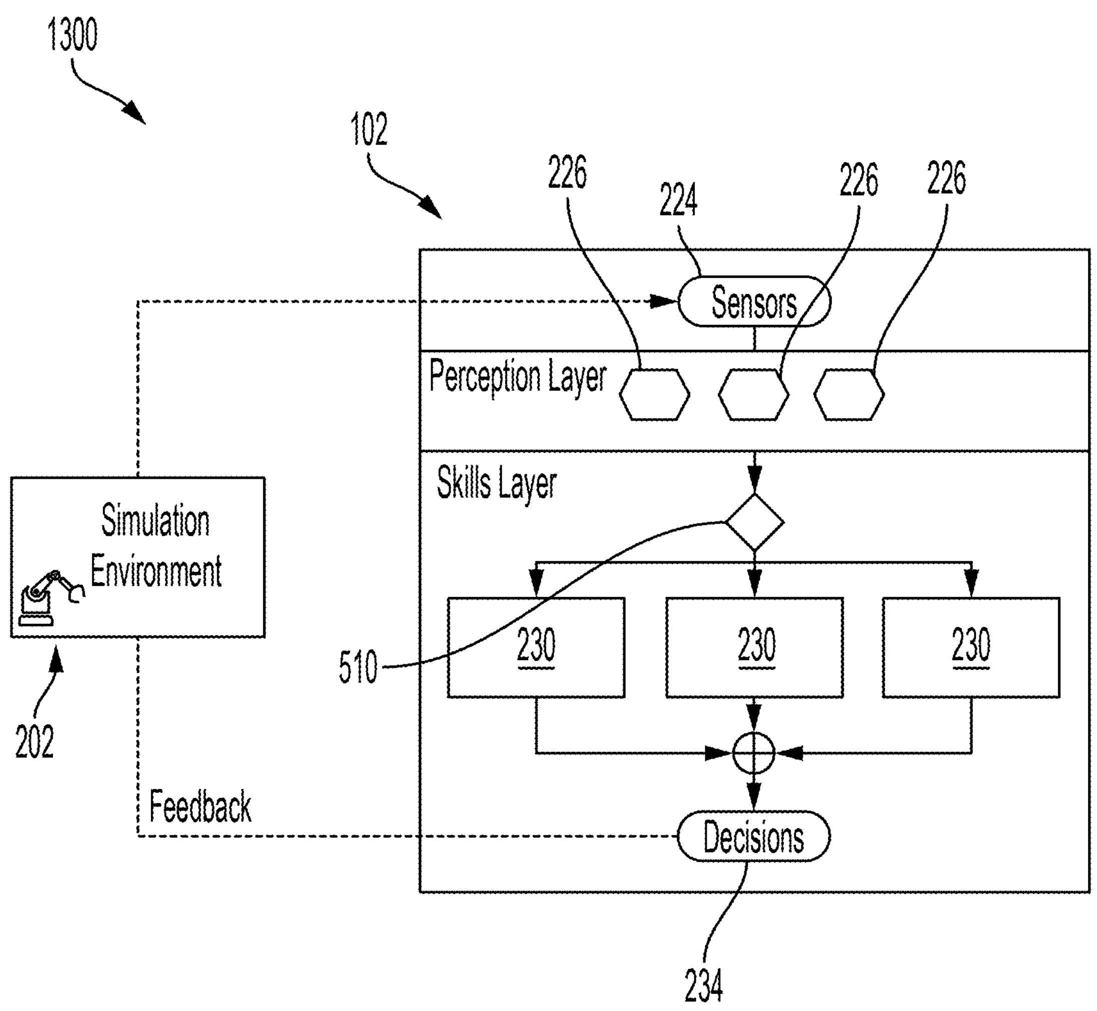
FIG. 13 is a high-level block diagram showing modules of an autonomous AI agent that interact with the simulation environment of the platform to dynamically transform an untrained autonomous AI agent into a trained autonomous AI agent in accordance with embodiments of the present invention.

FIG. 13 is a high-level block diagram 1300 showing modules of an autonomous AI agent 102 that interact with the simulation environment 202 of the platform 200 to dynamically transform an untrained autonomous AI agent 232 into a trained autonomous AI agent 238. Here, a sensor layer embodied by a sensor module 224 receives data from the observation space 218 of the simulation environment 202 and provides the data to a perceptor layer embodied by perceptor modules 226 when the AI agent 102 has a perceptor module 226 configured. The data from the perceptor layer is provided to a skill layer that can be embodied by a selector 510 which selects between multiple skills modules 230 or straight to a skill module 230 when there is no selector 510. The result of the skill layers is one or more performable actions 234 which is provided back to the action space 220 of the simulation environment 202 during the training cycle.

Returning to the flow diagram 400 of FIG. 4, the method concludes with the deployment module 216 exporting the trained autonomous AI agent 238 as executable code or a file artifact for the autonomous AI agent 240, for deployment in a real-world system 110 (Step 408). The exported autonomous AI agent 240 when executed can control the hardware and/or software of the real-world system 110 autonomously or generate a recommendation based on the data of the real-world system 110, wherein the exported autonomous AI agent 240 acts in an intelligent manner by perceiving the agent environment, taking actions autonomously to achieve goals, and improving the agent performance through learning using the data characterizing real-world expertise embodied in the one or more skills modules of the autonomous AI agent.

Figure 14:
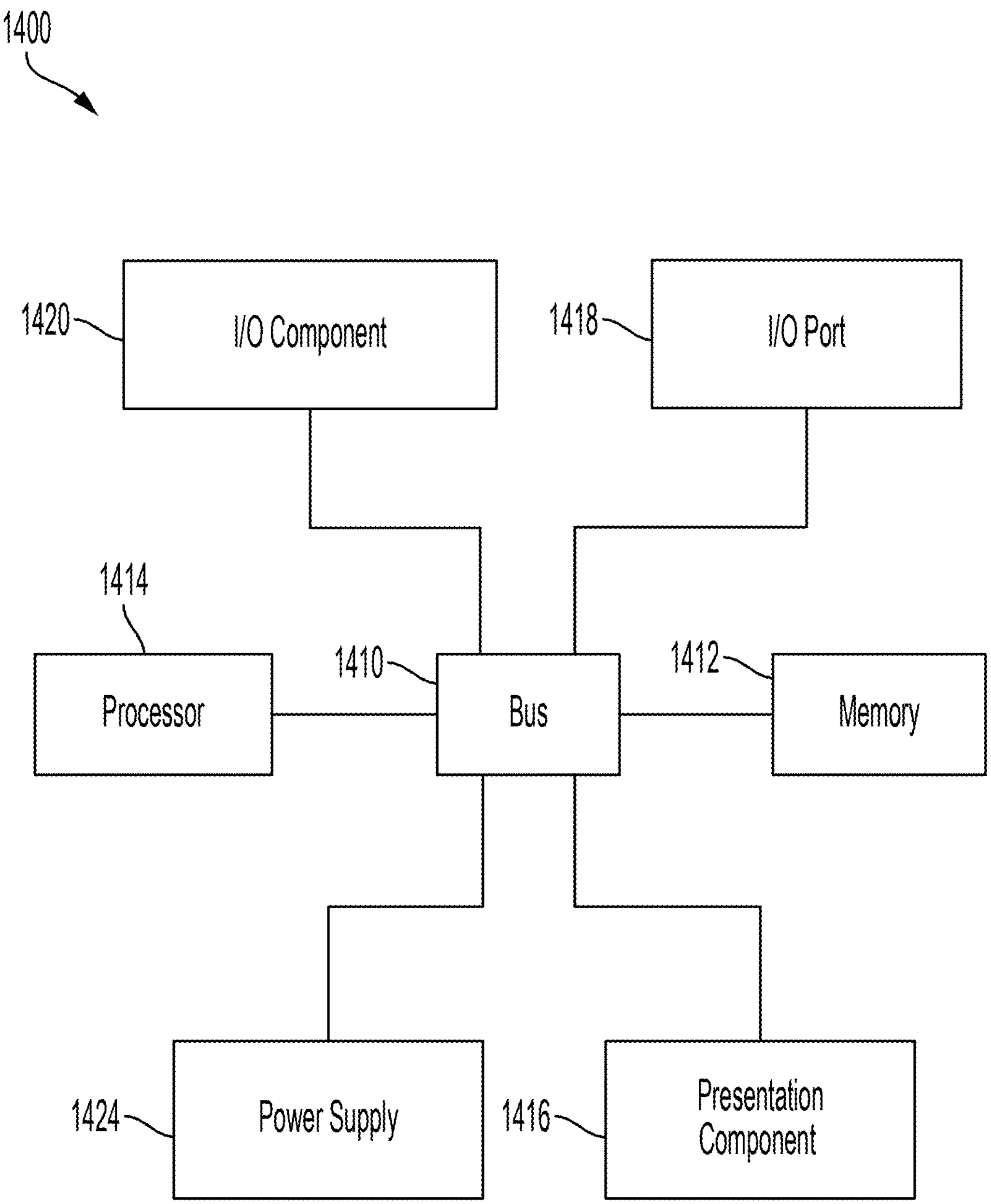
FIG. 14 is a diagrammatic illustration of a high-level architecture for implementing the platform in accordance with embodiments of the present invention.

A suitable and specifically configured electronic or computing device can be used to implement the functionality of the present invention described herein. One illustrative example of such an electronic or computing device 1400 is depicted in FIG. 14. The computing device 1400 is merely an illustrative example of a suitable computing environment and in no way limits the scope of the present invention. A "computing device," as represented by FIG. 14, can include a "workstation," a "server," a "laptop," a "desktop," a "device", a "smart device", a "tablet", a "smartphone", an "ECR" or other specifically configured computing devices, as would be understood by those of skill in the art. Given that the computing device 1400 is depicted for illustrative purposes, embodiments of the present invention may utilize any number of computing devices 1400 in any number of different ways to implement a single embodiment of the present invention. Accordingly, embodiments of the present invention are not limited to a single computing device 1400, as would be appreciated by one with skill in the art, nor are they limited to a single type of implementation or configuration of the example computing device 1400.

The computing device 1400 can include a bus or network 1410 that can be coupled to one or more of the following illustrative components, directly or indirectly: a memory 1412, one or more processors 1414, one or more presentation components 1416, input/output ports 1418, input/output components 1420, and a power supply 1424.

One of skill in the art will appreciate that the bus 1410 can include one or more busses, such as an address bus, a data bus, networks, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 14 is merely illustrative of an exemplary computing device that can be used to implement one or more embodiments of the present invention, and in no way limits the invention.

The computing device 1400 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD), Solid State Drive (SSD), cloud, or other optical or holographic media; magnetic cassettes, magnetic tape, magnetic disk storage or other magnetic storage devices that can be used to encode information and can be accessed by the computing device 1400.

The memory 1412 can include computer-storage media in the form of volatile and/or nonvolatile memory. The memory 1412 may be removable, non-removable, or any combination thereof. Exemplary hardware devices are devices such as hard drives, solid-state memory, optical-disc drives, and the like. The computing device 1400 can include one or more processors that read data from components such as the memory 1412, the various I/O components 1420, etc. Presentation component(s) 1416 present data indications to a user or other device. Exemplary presentation components include a display device, speaker, printing component, vibrating component, etc.

The I/O ports 1418 can enable the computing device 1400 to be logically coupled to other devices, such as I/O components 1420 using serial, parallel, or network, and/or wireless communication protocols. Some of the I/O components 1420 can be built into the computing device 1400. Examples of such I/O components 1420 include a microphone, joystick, recording device, gamepad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may, in some instances, depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A platform for designing and creating autonomous artificial intelligence (AI) agents for a specific task that act in an intelligent manner, the platform comprising:

a simulation environment that receives a simulator code defining a real-world modeled system and creates an environment simulation within the platform;

an agent shell configurator comprising a graphical user interface for the design and configuration of an autonomous AI agent that provides a graphical representation of an agent framework and receives modules provided by other configurators of the platform and selected using the graphical user interface that customize the agent framework to result in the autonomous AI agent designed for a specific task using the agent shell configurator;

a sensor configurator that creates sensor modules that are each configured to provide feedback to the autonomous AI agent, wherein the sensor modules are provided to the agent shell configurator for configuring the autonomous AI agent;

a perceptor configurator that creates perceptor modules that are each configured to receive sensor variables, process the sensor variables, and output one or more new sensor variables to the sensor configurator, which creates additional sensor modules based on the new sensor variables, wherein the perceptor modules are provided to the agent shell configurator for configuring the autonomous AI agent;

a scenario configurator that creates scenario modules that are each configured to operate autonomous AI agents in different conditions, wherein the scenario modules are provided to the agent shell configurator for configuring the autonomous AI agent;

a skills configurator that creates skills modules that are created to encode real-world expertise, wherein the skills modules are each configured to execute specific tasks using the encoded real-world expertise each skills module embodies, resulting in an action performed by the autonomous AI agent, wherein the skills modules are provided to the agent shell configurator for configuring the autonomous AI agent, and wherein the skills configurator is configured to save, export, and import skills to and from other agents created using the platform;

wherein the agent shell configurator, sensor configurator, perceptor configurator, scenario configurator, and skills configurator of the platform create an untrained autonomous AI agent designed for a specific task comprising:

one or more sensor modules created and provided by the sensor configurator and selected for the autonomous AI agent using the agent shell configurator, optionally one or more perceptor modules created and provided by the perceptor configurator and selected for the autonomous AI agent using the agent shell configurator, one or more scenario modules created and provided by the scenario configurator and selected for the autonomous AI agent using the agent shell configurator, one or more skills modules created and provided by the skills configurator and selected for the autonomous AI agent using the agent shell configurator, and one or more performable actions;

a training module that implements a plurality of training exercises executed by the autonomous AI agent, which dynamically transform the untrained autonomous AI agent designed for a specific task into a trained autonomous AI agent using the skills modules of the autonomous AI agent; and a deployment module that exports the trained autonomous AI agent as executable code or file artifact;

wherein, when the exported trained autonomous AI agent is deployed as executable code or file artifact in a real-world system to control hardware and/or software of the real-world system autonomously or generate a recommendation based on data of the system, the exported autonomous AI agent acts in an intelligent manner by perceiving environment, taking actions autonomously to achieve goals, and improving performance through learning using the encoded real-world expertise embodied in the one or more skills modules of the autonomous AI agent.

2. The platform of claim 1, wherein the simulation environment comprises:

an observation space where data points are available; and an action space establishing the actions that can be performed.

3. The platform of claim 1, wherein the agent shell configurator creates agents having a type selected from a group consisting of:

autopilot;

operator;

trader;

producer;

scheduler;

building engineer; and assembler.

4. The platform of claim 1, wherein the scenario modules receive one or more of: discrete variables, continuous variables, and continuous variable ranges.

5. The platform of claim 1, wherein the scenario configurator assigns created scenario modules to skills modules.

6. The platform of claim 1, wherein the skills modules have a category type comprising one or more selected from a group consisting of:

learned skill;

selector skill;

controller skill; and coordinated skill.

7. The platform of claim 1, wherein the skills are orchestrated using one or more of: selector skills, sequencing, looping, or hierarchy.

8. The platform of claim 1, wherein a skill performed by the skills module is one of learned skill or programmed skill.

9. The platform of claim 8, wherein the programmed skill is defined through calculations, rules, and algorithms.

10. The platform of claim 8, wherein a learned skill is learned through deep reinforcement learning (DRL).

11. The platform of claim 1, wherein the autonomous AI agent comprises one or more defined goals.

12. The platform of claim 11, wherein the training module provides functions for an autonomous AI agent to achieve a goal comprising:

compute reward;

compute terminate; and compute success criteria.

13. The platform of claim 1, wherein the training module enables rules to be defined for the autonomous AI agent during training exercises executed by the autonomous AI agent.

14. The platform of claim 1, wherein the training module provides functions for an autonomous AI agent to manage information comprising:

transform sensor variables;

transform actions; and filtering sensors.

15. A method of designing and creating autonomous artificial intelligence (AI) agents for a specific task that act in an intelligent manner, the method comprising:

providing a platform for designing and creating autonomous AI agents for a specific task, the platform comprising:

a simulation environment that receives a simulator code defining a real-world modeled system and creates an environment simulation within the platform;

an agent shell configurator comprising a graphical user interface for the design and configuration of an autonomous AI agent that provides a graphical representation of an agent framework and receives modules provided by other configurators of the platform and selected using the graphical user interface that customize the agent framework to result in the autonomous AI agent designed for a specific task using the agent shell configurator;

a sensor configurator that creates sensor modules that are each configured to provide feedback to the autonomous AI agent, wherein the sensor modules are provided to the agent shell configurator for configuring the autonomous AI agent;

a perceptor configurator that creates perceptor modules that are each configured to receive sensor variables, process the sensor variables, and output one or more new sensor variables to the sensor configurator, which creates additional sensor modules based on the new sensor variables, wherein the perceptor modules are provided to the agent shell configurator for configuring the autonomous AI agent;

a scenario configurator that creates scenario modules that are each configured to receive and operate autonomous AI agents to in different conditions, wherein the scenario modules are provided to the agent shell configurator for configuring the autonomous AI agent;

a skills configurator that creates skills modules that are created to encode real-world expertise wherein each skills module is configured to execute specific tasks using the encoded real-world expertise of the skills module resulting in an action performed by the autonomous AI agent, wherein the skills modules are provided to the agent shell configurator for configuring the autonomous AI agent, and wherein the skills configurator is configured to save, export, and import skills to and from other agents created using the platform;

a training module that implements a plurality of training exercises executed by the autonomous AI agent which dynamically transform the autonomous AI agent into a trained autonomous AI agent using the skills modules of the autonomous AI agent; and a deployment module that exports the trained autonomous AI agent as executable code or file artifact;

creating an untrained autonomous AI agent designed for a specific task using the agent shell configurator, sensor configurator, perceptor configurator, scenario configurator, and skills configurator of the platform, the autonomous AI agent comprising:

one or more sensor modules created and provided by the sensor configurator and selected for the autonomous AI agent using the agent shell configurator, optionally one or more perceptor modules created and provided by the perceptor configurator and selected for the autonomous AI agent using the agent shell configurator, one or more scenario modules created and provided by scenario configurator and selected for the autonomous AI agent using the agent shell configurator, one or more skills modules created and provided by the skills configurator and selected for the autonomous AI agent using the agent shell configurator, and one or more performable actions;

the training module dynamically transforming the untrained autonomous AI agent designed for a specific task into a trained autonomous AI agent; and the deployment module exporting the trained autonomous AI agent as executable code or file artifact for deployment in a real-world system to control hardware and/or software of the real-world system autonomously or generate a recommendation based on data of the real-world system, wherein the exported autonomous AI agent acts in an intelligent manner by perceiving an agent environment, taking actions autonomously to achieve goals, and improving performance through learning using the encoded real-world expertise embodied in the one or more skills modules of the autonomous AI agent.

16. The method of claim 15, wherein the simulation environment comprises:

an observation space where data points are available; and an action space establishing the actions that can be performed.

17. The method of claim 15, wherein the agent shell configurator creates agents having a type selected from a group consisting of:

autopilot;

operator;

trader;

producer;

scheduler;

building engineer; and assembler.

18. The method of claim 15, wherein the scenario modules receive one or more of: discrete variables, continuous variables, and continuous variable ranges.

19. The method of claim 15, wherein the scenario configurator assigns created scenario modules to skills modules.

20. The method of claim 15, wherein the skills modules have a category type comprising one or more selected from a group consisting of:

learned skill;

selector skill;

controller skill; and coordinated skill.

21. The method of claim 15, wherein the skills are orchestrated using one or more of: selector skills, sequencing, looping, or hierarchy.

22. The method of claim 15, wherein a skill performed by the skills module is one of learned skill or programmed skill.

23. The method of claim 22, wherein the programmed skill is defined through calculations, rules, and algorithms.

24. The method of claim 22, wherein a learned skill is learned through deep reinforcement learning (DRL).

25. The method of claim 15, wherein the autonomous AI agent comprises one or more defined goals.

26. The method of claim 25, wherein the training module provides functions for an autonomous AI agent to achieve a goal comprising:

compute reward;

compute terminate; and compute success criteria.

27. The method of claim 15, wherein the training module enables rules to be defined for the autonomous AI agent during training exercises executed by the autonomous AI agent.

28. The method of claim 15, wherein the training module provides functions for an autonomous AI agent to manage information comprising:

transform sensor variables;

transform actions; and filtering sensors.

* * * * *